Nov. 22, 1960    R. E. JASPERSON    2,961,191
AUTOMATIC ONE-STAR NAVIGATIONAL DIRECTORS
Filed March 1, 1957    3 Sheets-Sheet 1

INVENTOR
ROB'T. E. JASPERSON
BY

ATTORNEY

INVENTOR
ROB'T. E. JASPERSON
BY
ATTORNEY

Nov. 22, 1960   R. E. JASPERSON   2,961,191
AUTOMATIC ONE-STAR NAVIGATIONAL DIRECTORS
Filed March 1, 1957   3 Sheets-Sheet 3
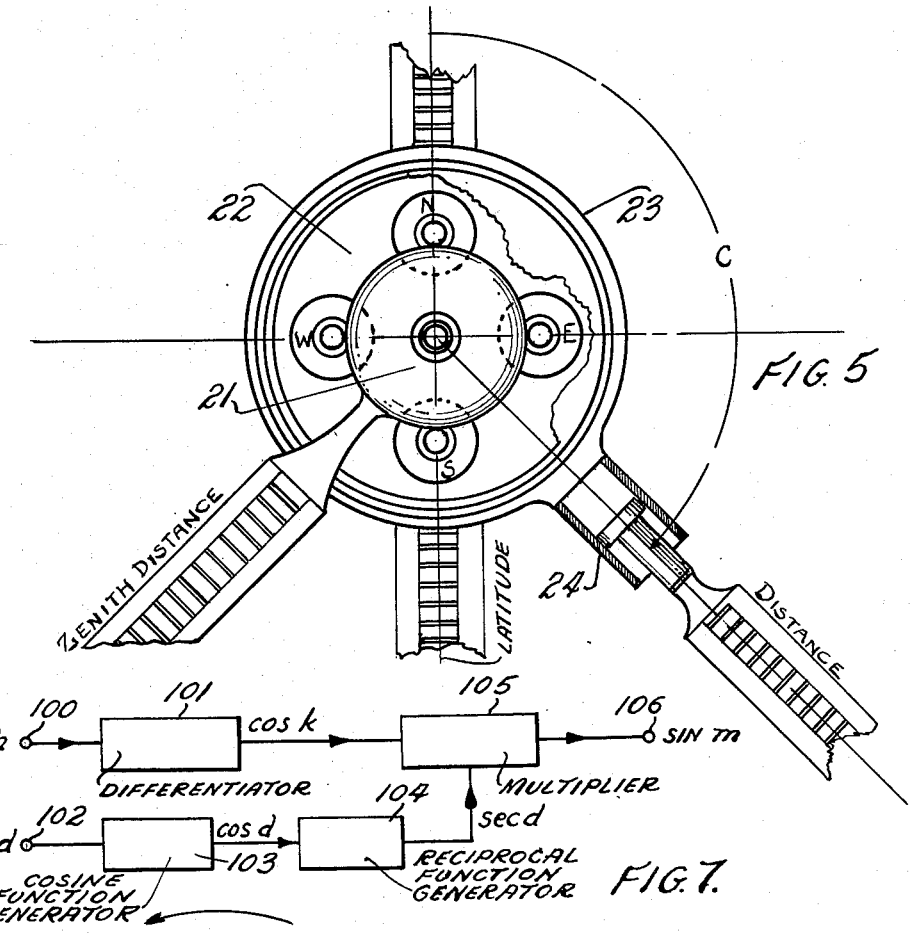
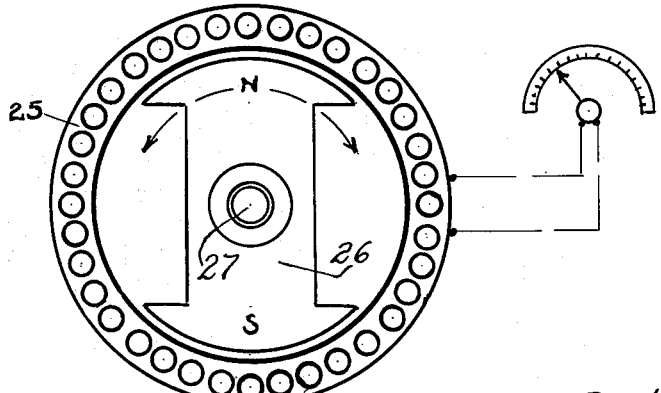
INVENTOR
ROB'T. E. JASPERSON
BY
ATTORNEY

United States Patent Office 2,961,191
Patented Nov. 22, 1960

2,961,191
AUTOMATIC ONE-STAR NAVIGATIONAL DIRECTORS

Robert Edward Jasperson, Ferry Farms, Annapolis, Md.

Filed Mar. 1, 1957, Ser. No. 643,370

7 Claims. (Cl. 244—14)

(Granted under Title 35, U.S. Code (1952), sec. 266)

The invention described herein may be manufactured and used by or for the Government of the United States of America for governmental purposes without the payment of any royalties thereon or therefor.

This invention relates to means for determining and indicating automatically and continuously the geographical position of an airborne, sea or land craft or missile, and for directing said craft to any other geographical position by automatic reference to the altitude of a single celestial body. In the form illustrated, it is particularly adapted for use on aircraft or guided missiles, since this type of vehicle usually changes its geographical position too rapidly to allow the normal time-consuming observations and manual operation of navigational instruments now used on aircraft, to provide for timely and proper operation of the controls in the craft so as to direct it most expeditiously toward either a predetermined destination or toward a new destination suddenly determined upon.

One object of the present invention is to provide an instrument having means responsive to the relative location of a single celestial body for indicating automatically and continuously the geographical position of the instrument as well as the true bearing or azimuth of the celestial body observed.

Another object is to provide a movable instrument having stabilized means which are trainable on and which will then automatically follow the position of a single celestial body, and connecting linkage operated by these means for continuously indicating the instantaneous geographical position of the instrument.

A further object is to provide an instrument as defined in the above paragraph having further automatic means for guiding a craft or missile in which it is mounted to any other predetermined geographical position over a great circle route or a series of great circle routes successively, or to define precisely the true bearing or azimuth of a selected geographical position relative to a single celestial body.

These and other specific objects will become apparent as the description of an illustrative embodiment of this invention proceeds, having reference to the accompanying drawings, wherein;

Fig. 5 is a plan view of an improvement over the computer described in U.S. Patent No. 2,444,933 in which pin 17 illustrated therein is replaced by a point source of light and the arcuate member which is a measure of distance-to-go to destination is flexibly secured to the latitude slide.

Fig. 6 is a cross-sectional end view of a voltage generator designed to produce a voltage proportional to the derivative of altitude with respect to time.

Fig. 7 is a schematic diagram of an illustrative computer.

Much of the problem of meeting today's navigation requirements centers around the need for equipment and systems which will provide instantaneous and continuous navigation information automatically and either display this information for the pilot or navigator in easily-readable form or relay it to an auto-pilot for the automatic guidance of the vehicle. The high speeds of today's jet aircraft have exceeded in many instances human capabilities to perform all the functions necessary to flight. Time-consuming arithmetical computations required for manual dead-reckoning and celestial techniques provide navigation fix information considerably behind the aircraft position. For example, to obtain a three-star fix requires approximately twelve to fifteen minutes, during which time the aircraft will have travelled a distance of approximately 100 miles. This distance will increase as we move toward the higher speeds of the future, resulting in navigation information which is virtually useless. For certain military operations the navigation system must be capable of providing accurate information at either high or low altitudes, above or below the overcast. One of the principal objects of this invention is to combine an inertial unit possessing a high degree of accuracy over limited intervals of time at any altitude, regardless of visibility, with celestial unit capable of fixing position precisely with relation to a single celestial body, and of monitoring the performance of the inertial component.

In the operation of surface craft or submarines the occasion frequently arises in which a geographical fix is urgently required. This usually occurs following a prolonged period during which observations of the celestial bodies have not been had, due either to poor visibility or submergence, succeeded by the appearance of a single celestial body, such as the sun. The purpose of this invention, as already pointed out, is primarily to provide means for determining and indicating automatically and continuously geographical position by means of observations of the altitude of a single celestial body.

The determination of exact geographical location plus a precise knowledge of the direction of the local meridian is vitally important in the sighting of military equipment such as artillery, tanks, rocket launchers and ballistic missile launching pads. Another purpose of this invention is to provide a means for fixing position and determining the direction of north by means of observations of the altitude of a single celestial body.

Figures 1, 3:
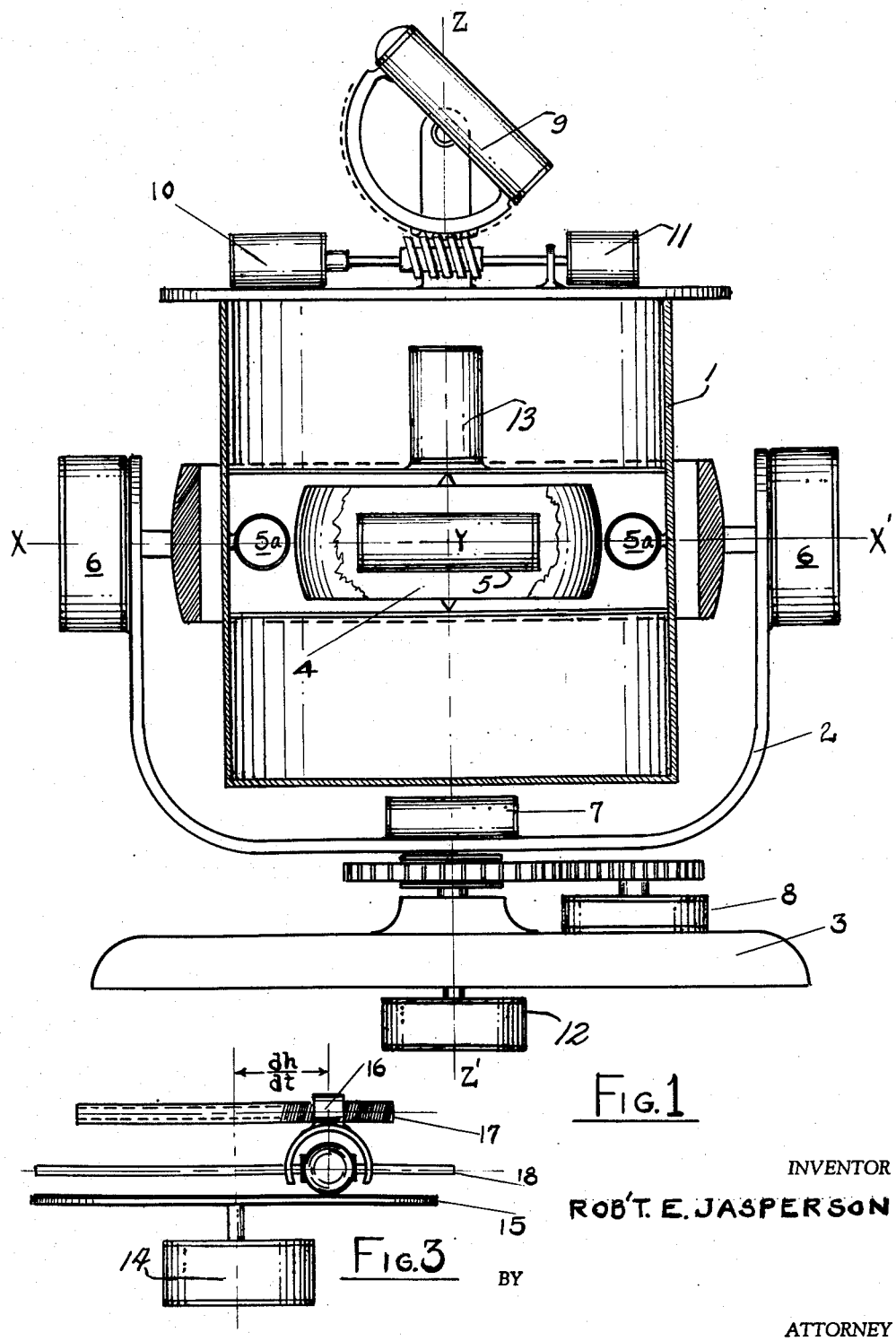
Fig. 1 is a side elevation of the director, partially in cross-section, illustrating the arrangement of the several components which together constitute the complete system.
Fig. 3 is illustrative of a preferred type of integrator or rate-regulator.

In Fig. 1 a non-pendulous casing 1 is gimbally supported within bracket 2 and pedestal 3 to have freedom of rotation about the X, Y and Z orthogonal axes. Additional gimbals may be added as necessary. The casing is stabilized with respect to gravity by means of gyro 4 slaved to accelerometers 5 through the medium of torquers 6 (here shown only in the X axis). It is oriented in the N—S plane by means of a directional gyro, or gyro compass, 7 which provides signals to actuate azimuth motor 8. An automatic sextant 9 is mounted atop casing 1; which latter provides a stable platform. Auto-sextant 9 may take any one of several conventional forms of celestial trackers, or a combination thereof, including those of the radiometric as well as of the optical type. Several preferred forms of optical trackers are described in detail in U.S. Patent No. 2,444,933. A conventional averaging auto-sextant may be employed (in combination with a suitable rate-regulator) to provide a continuous readout of the altitude of a selected celestial body. Conventional integrators, resolvers, amplifiers, selectors and computers are contained within casing 1 for purposes to be described.

Auto-sextant 9 is actuated in elevation by motor 10 in response to signals originating within the sextant and relayed through a regulator, as will become apparent as the description proceeds. The rotation of the actuating shaft of the sextant is measured by a conventional digitizer 11 capable of reading-out and relaying to a suitable computer angular measure expressed in tenths of a minute of arc. A similar digitizer 12 relays to remote stations, including a computer, the angular rotation of the director about the Z axis, as will presently be described in more detail. A conventional accelerometer or sensitive altimeter 13 measures velocity changes in the vertical plane as part of the function of the inertial unit.

In Fig. 3 a conventional ball-disc integrator is powered by a constant-speed motor 14 which drives a disc 15 at a predetermined speed. A collar 16, actuated by screw-thread 17, serves to position the follower ball which is responsive to the rotation of disc 15 along shaft 18, and which imparts to shaft 18 a rotation proportional to the distance of the ball from the center of disc 15.

Figure 2:
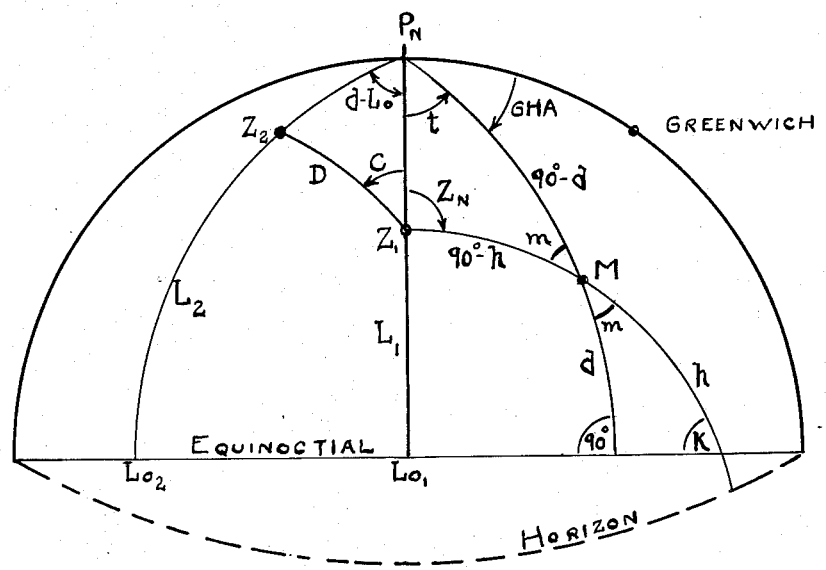
Fig. 2 is a diagrammatic representation of the relationship between elements of the celestial sphere and those of the terrestrial sphere to illustrate the derivation of the formulae necessary to the solution of problems associated with the practice of the art of celestial navigation, as well as of inertial navigation.

In Fig. 2 the following symbols, designations and formulae pertain:

$P_n$—North celestial pole.
$Z_1$—Zenith of a geographical position designated "1."
$Z_2$—Zenith of a geographical position designated "2."
M—The celestial body being tracked.
$L_1$—Latitude of $Z_1$.
$L_2$—Latitude of $Z_2$.
$Lo_1$—Longitude of $Z_1$.
$Lo_2$—Longitude of $Z_2$.
d—Declination of body M.
h—Altitude of body M.
GHA—Greenwich hour angle of body M.
t—Local hour angle of body M.
$Z_n$—Azimuth of body M.
d—Lo—Difference of longitude between $Z_1$ and $Z_2$.
C—Course from $Z_1$ to $Z_2$.
D—Distance from $Z_1$ to $Z_2$.
m—The angle formed by the great circle through M and $P_n$ and that through M and $Z_1$.
k—An auxiliary angle formed by the intersection of the great circle through $Z_1$ and M with the Equinoctial.

*Formulae*

(1) $\cos k = dh/dt$.
(2) $\sin m = \cos k \sec d$.
(3) $\sin L_1 = \sin h \sin d +/- \cos h \cos d \cos m$.
(4) $\sin h = \sin L_1 \sin d +/- \cos L_1 \cos d \cos t$.
(5) $\cos D = \sin L_1 \sin L_2 + \cos L_1 \cos L_2 \cos d - Lo$.
(6) $\sin t = \sin m \cos h \sec L_1$.
(7) $\sin Z_n = \sin t \cos d \sec h$; or $\sin Z_n = dh/dt \sec L_1$.
(8) $\sin C = \sin d - Lo \cos L_2 \sec (90° - D)$; or, $\sin C = dD/dd - Lo \sec L_1$.

Referring to triangles $PZ_1M$ and $PZ_1Z_2$ it will be apparent that if three elements of either triangle are known the remaining elements may be computed in a simple straight-forward manner. The equations involve the addition, subtraction, multiplication and division of decimal fractions. Computers capable of processing these equations automatically are available in a variety of forms, sizes and weights. Accuracy must be expressed in terms of a tenth of a minute of arc, at least.

The essence of this solution to the problem of determining position by means of the measurement of the altitude of a single celestial body resides in Equation 1, above. In the simplest form of the practice of this art, in which a series of observations of the altitude of a body are taken over a selected interval of time, the value of $\cos k$ may be obtained as follows:

$$\cos k = \frac{\sin \tfrac{1}{2}(h_1 - h_3)}{\sin \tfrac{1}{2}(t_1 - t_3)} \cdot \frac{\cos \tfrac{1}{2}(h_1 + h_3)}{\cos h_2}$$

where:

$h_1$ = altitude measured at time $t_1$ (in arc).
$h_3$ = altitude measured at time $t_3$ (in arc).
$h_2$ = altitude measured midway between $t_1$ and $t_3$.

When altitudes are measured with a conventional marine sextant against the sea horizon an observing interval of at least 8 minutes should be permitted to elapse in order to establish accurately the rate-of-change of altitude. In the case of the sun this corresponds to a change of 2° of arc. All that can be said about the results which may be expected from this solution is that the accuracy of the answers will be no greater than the accuracy of the input data. The mathematical solution is elegant; the application of the solution to present practice will require an instrumentation possessing a high degree of accuracy.

Since this invention envisages a fully-automatic system each component which enters into the overall director will be described in detail. The first essential is a horizontal reference plane from which to measure the altitude (zenith-distance) of the selected celestial body. This is provided by non-pendulous casing 1 in which is mounted gyro rotor 4, whose spin axis corresponds with the Z axis of the director. Rotor 4 is cut away to show one of a pair of integrating accelerometers 5a secured within casing 1 parallel to the X axis. Another pair of integrating accelerometers 5 is secured within casing 1 parallel to the Y axis of casing 1, as shown. These accelerometers, arranged in pairs to provide fail-safe performance, are designed to detect a tilt of casing 1, that is either the angle which the top of the casing makes with the horizontal or the angle which the spin axis makes with the true vertical, about either the X or the Y axes and to generate proportional electrical signals which may be utilized to actuate torquers 6 (those in the Y axis not shown) to precess the spin axis of rotor 4 in the proper amount and direction to remove any tilt of casing 1 from the true vertical; assuming the director to be at rest.

If the vehicle carrying the director is moving with uniform linear velocity, as in the direction X—X' for example, the effect upon the accelerometers 5 in the X—X' axis would be the same as a tilt of the casing in a counter-clockwise direction. Signals from accelerometers 5 would be relayed to torquers 6 via a rate-regulator as shown in Fig. 3 to impart a precessional torque to the spin axis of gyro 4 proportional to the rate at which the director is passing through the lines-of-force of the earth's gravitational field. If the vehicle is moving also in the Y—Y' plane a similar precessional torque would be exercised by the torquers 6 in the Y—Y' axis (not shown) to maintain the Z axis of the director in the earth's gravitational field.

If, while proceeding at uniform linear velocity in the direction X—X', the vehicle experiences an acceleration in the direction of travel the accelerometers 5 in the X—X' axis would interpret this change of velocity as a tilt in a counter-clockwise direction and would respond as before to increase the rate of precession of the gyro spin axis in a clockwise direction. The same would apply to an acceleration in the Y—Y' axis.

Since the accelerometers 5 are merely aperiodic pendulums they cannot distinguish between a tilt and an acceleration in the horizontal plane. This phenomenon is expressed by Einstein as the "Equivalence Principle." Thus a combination of forces may arise wherein a tilt and an acceleration will exactly cancel out; i.e., the accelerometers might read zero when actually a tilt exists. This is true in the case of a turn, coordinated or otherwise.

Since, however, casing 1 is statically balanced and gyro rotor 4 is dynamically balanced, the only pendulous elements in the array are accelerometers 5, the gravity-sensitive components. Just as the pendulous element of a conventional marine gyro-compass may be cut out automatically during a high-speed turn so may accelerometers 5 be disconnected automatically when the vehicle experiences accelerations exceeding a pre-determined magnitude. While so disconnected the gyro would continue to precess at the last indicated rate. The purpose of accelerometer 13 will now become apparent. Its function, in addition to supplying information to the inertial unit regarding altitude above the earth's surface, as well as rate-of-change of such altitude, is to serve as an automatic cut-out of accelerometers 5 when abnormal changes of velocity occur in the Z axis.

In connection with the discussion of the problem of stabilization it should be borne in mind that the director envisioned herein is intended primarily to function at maximum efficiency during the so-called "cruise phase" of a particular flight or missile trajectory, and not during periods of extensive aerobatics. During the mid-course, or cruise, phase it may be assumed that the vehicle is being controlled to fly as nearly straight and level as is practicable, and that forces tending to disrupt such flight are transient in nature. Thus a spurious indication of the vertical resulting from a tilt and an acceleration in combination need not be expected to continue over an extended interval of time. In addition, a tilt of casing 1 can be occasioned only by gyro drift or an incorrect integration of a velocity change (acceleration). When the acceleration ceases (uniform linear velocity resumed) the accelerometers will detect the tilt and direct the torquers to correct it. To accomplish these objectives within the framework of accuracies envisioned will require accelerometers and integrators, or integrating accelerometers, possessing a sensitivity on the order of at least $10^{-5}$ g. and a response time expressed in milliseconds, at least. Since the accelerometers discussed herein form no part of this invention it may only be assumed that units having the requisite degree of accuracy will be available.

In order to eliminate spurious signals from the accelerometers the casing 1 should be mounted at the center of gravity of the carrying vehicle and any convenient means provided to relay the position of the stable platform to a desired location in the vehicle. The platform should be further stabilized by associating it with a heading indicator, such as by mounting the casing 1 on a compass repeater, whereby the platform may be orientated with respect to the local meridian thus reducing signals produced by yaw and turn to acceptable proportions.

While this assumption regarding the ability of accelerometers to slave a gyro with the accuracy required for stabilization may be valid it is recognized that an accuracy of a much higher order of magnitude will be required if the inertial system is to function precisely over an extended period of time. It is well known that the inherent weakness of most inertial systems resides in the fact that errors in integrating velocity changes to obtain displacement accumulate with time and that these errors must be corrected periodically by reference to some exterior source, such as radio or electronic aids, visual observations of recognizable land-marks, or position-fixing through the medium of observations of the celestial bodies. The build-up of errors in a pure inertial navigation system has authoritatively been referred to as "intolerable."

Auto-sextant 9, mounted on the stable platform provided by casing 1, may take any one of several conventional forms, or combinations thereof, and hence forms no part of this invention. A preferred form is illustrated in Figs. 8 and 9 of U.S. Patent No. 2,444,933 wherein an image-orthicon tube is employed to convert light energy into electrical energy in order to create "up-down" and "right-left" signals designed to maintain the center-line of the tracker in exact alignment with the celestial body being observed. This type of instrument may be adjusted to track a light source of any given wave length and hence is capable of tracking the sun, the moon, the planets or the navigational stars. It has a particular advantage in that it can distinguish between platform error and possible rotation of the tracker around the line-of-sight to the celestial body; an ability lacking in several other types of trackers. Recent advances in the art of magnifying the intensity of a light source will permit the tracking of faint stars, if necessary, since such light sources are reportedly being multiplied a million fold.

Before proceeding with a detailed description of the celestial component it will be well to review the function of the inertial unit. This component is composed of two pairs of accelerometers 5 and 5a mounted within casing 1, one pair in the X axis and one pair in the Y axis, as shown. It is assumed that conventional accelerometers having a sensitivity of at least $10^{-5}$ g. will be available. Integrating accelerometers or velocimeters are preferred since they permit of a direct reading of velocity changes. The director is oriented in the north-south, east-west planes through the medium of directional gyro 7; hence the accelerometers are similarly oriented. At rest the inertial unit will serve primarily to stabilize the director in the true vertical. In motion, the accelerometers will supply velocity signals to precess the gyro axis into the gravitational vertical as well as displacement signals (second integral of acceleration) to a computer, to be described, for the purpose of establishing continuously the location of the vehicle. In essence, these two units together constitute an inertial system which, per se, forms no part of this invention. Novelty resides in extracting velocity signals from the inertial unit to slave the gyro element 4 to the earth's gravitational field. Signals from a pair of accelerometers may be added together, averaged or they may be placed on a duty cycle.

Analog-type computers capable of performing spherical trigonometric computations of the type required for the navigation system hereindisclosed have long been used in aviation. However, since the extreme accuracies needed for present inertial systems go beyond those required for previous types of applications, digital computers have been developed which are able to solve inertial system computations in a fraction of a second. Typical of these computers are those developed by North American Aviation. Referring to Figs. 1 and 7, signals from a shaft angle converter 11 (Fig. 1) may be applied to a terminal 100 which is coupled to a differentiator 101. Differentiator 101 may be a simple R-C circuit or may, for high accuracies, comprise an instrument such as a Librascope Ball and Disc Integrator (appropriately coupled). The output of differentiator 101, in accordance with Equation 1, is equal to cosine $k$. Signals proportional to $d$ may be manually generated in the case of a manned craft or obtained from a storage unit in the case of an unmanned craft and in either event applied to terminal 102 which is coupled to a cosine function generator the output of which is coupled to a reciprocal function generator from which is obtained a signal proportional to secant $d$. The use of a cosine generator and a reciprocal function generator may be desired since it is difficult to directly generate the secant function. This technique and the instrumentation thereof is described, for example, in U.S. Patent No. 2,818,211. The output from differentiator 101 and reciprocal function generator 104 are coupled in a conventional multiplier (a vast variety of which are known to the art) to provide an output signal proportional to sine $m$ in accordance with Equation 2. In a similar manner Equations 3 through 8 may be instrumented in a straight forward manner.

If, while the director is at rest, tracking sextant 9 is able to acquire its designated celestial body, either optically or radiometrically, the computer unit will determine the exact location of the director in terms of Latitude and Longitude, as well as the course and distance to a selected geographical position. This is accomplished as follows:

Signals from auto-sextant 9 are relayed to a motor actuating shaft 17 of the ball-disc integrator illustrated in Fig. 3. Rotation of shaft 17 positions the follower ball with respect to the center of the driving disc 15, which is rotated at a pre-determined constant speed by motor 14. The resulting rotation of shaft 18 is imparted to the generator of a conventional servo system which, in turn, relays the rotation to motor 10 of the servo loop. This technique is frequently referred to as "aided tracking." Once the proper "rate" has been established the auto-sextant will be caused to "look" at its designated celestial body until the rate changes and additional signals are generated. A similar technique is employed to actuate motor 8 to maintain the tracker properly oriented in azimuth, or relative bearing. Conventional digitizers 11 and 12 relay values of the altitude and of the bearing of the body tracked to the computer unit. The value of $dh/dt$, the derivative of altitude with respect to time (in arc), which is measured as the distance of slide 16 from the center of disc 15, is also relayed to the computer unit.

An alternative technique for obtaining the exact value of $dh/dt$ is illustrated in Fig. 6, which is a cross-sectional end view of a conventional voltage generator modified to permit rotation of the stator field 25 in a counter-clockwise direction at a rate proportional to mean time; i.e., 15° per hour (=15' per min. or 15" per sec.). The rotor 26, rotatable about shaft 27 in either a clockwise or counter-clockwise direction, is actuated in response to signals generated by digitizer 11. Digitizer 11 is capable of reading out a shaft rotation accurately to 0.1° (=6'). The drive shaft actuated by motor 10 imparts to tracker 9 a rotation of 1° (60') for each rotation of the drive shaft. Thus the digitizer is capable of reading out 1 part in 21,600 (1°×60'×6'=60×60×6=21,600). Assume that a celestial body in the Equinoctial is tracked by a director of the type described which is stationary on the Equator, and that the body is rising. The rate-of-change of the altitude of the body observed will be 15° per hour, which value is read by the digitizer and imparted to rotor 26 in a counter-clockwise direction. Since the field and the rotor are rotating in the same direction at the same speed no voltage will be generated, which means that the ratio between the earth's rotation and the rate-of-change of altitude is unity; i.e., $dh/dt=1.00000$, as registered by a voltmeter. If the director is moving eastward along the Equator at 900 knots (=15° per hour) and the body is to the eastward (rising) digitizer 11 will impart to rotor 26 a clockwise rotation. The resulting voltage, as registered by a conventional voltmeter, will be proportional to $dh/dt$; viz, 2.00000. If the director is moving westward along the Equator at 900 knots the altitude of the body observed will not change, rotor 26 will be stationary and the derivative of altitude with respect to time $(dh/dt)$ will be 0.00000. Under any other combination of motion of the vehicle containing the director relative to the body observed will be indicated by the voltmeter. This indication may be expressed digitally with a high degree of accuracy and relayed to the computer unit.

Values of the Declination and Greenwich hour angle of the celestial body being tracked, as extracted from the nautical Almanac, will be relayed continuously to the computer unit where, in combination with altitude ($h$) and rate-of-change of altitude ($dh-dt$), they will be converted into terms of Latitude and Longitude through the medium of Equations 1, 2, 3 and 6. It is to be noted in Fig. 2 that Longitude $(Lo)=GHA-/-t$. The results of this computation may be compared with the known position of the director at rest and any errors may be corrected. In this connection it is interesting to note that all geographical locations are based initially on celestial observations.

If the selected celestial body cannot be tracked due to lack of visibility or of a radiometric sextant the computer will solve Equations 4 and 7 to direct the tracker to "look" continuously in the direction of the selected body. Assuming that the director is mounted in an aircraft which now takes off the inertial unit will immediately commence generating positional information which may be relayed to the computer unit to orient the tracker with respect to the celestial body so that when the latter becomes visible the tracker may "lock on" and commence tracking, at which point the celestial system will automatically take control. Whenever the tracker becomes "unlocked" for any reason the inertial system will take control and compute not only position but altitude and azimuth as well. When the celestial system is operative the computer will solve Equation 7 accurately. This value will serve to correct any error in gyro 7 and thus to maintain the orientation of the director precisely in the true north-south plane. This feature alone vastly enhances the value of this director as compared with other known systems.

Figure 4:
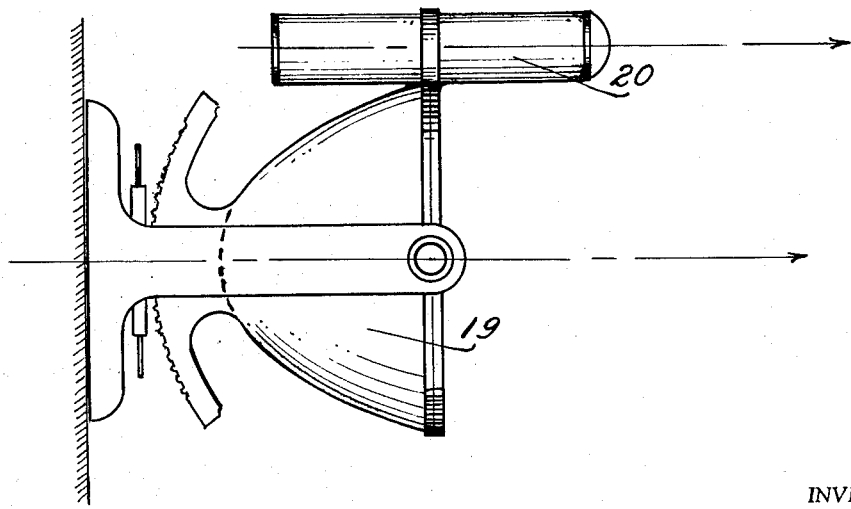
Fig. 4 is a side elevation of a combined radiometric and optical tracker.

Fig. 4 is illustrative of a preferred combination of a radiometric sextant 19 and an optical tracker 20 collimated to track the same celestial body. The purpose of this combination is to permit of continuous accurate tracking under varying conditions of visibility. Thus if the selected celestial body is the sun the radiometric sextant will track, with a certain degree of accuracy through the overcast, under which conditions tracker 20 is "blind." Upon emerging from the overcast the optical tracker will immediately lock on and commence tracking, presumably with a higher degree of accuracy than that of which sextant 19 is capable. Certain limitations inherent in tracker 19 may necessitate the use of an optical tracker such as 20 in a variety of circumstances.

In the arrangement shown in Fig. 5 a point source of light, either an electric lamp or a self-contained radio-active source, is contained within a hemispherical reflector 21 attached to the extremity of the arcuate member of the computer which measures zenith distance $(90°-h)$ so as to direct a circular beam of light downward (into the plane of the paper). The latitude slide 22 of the computer carries an array of four photo-electric cells labelled N, S, E, and W, as shown. These cells are designed to convert light energy into electrical energy and to generate signals which, when applied to the motors which actuate the latitude slide and the longitude slide, will cause the latitude slide to move "up" or "down" and the longitude slide to move "right" or "left." Response to these signals will be in step functions of 1' of arc each. When the four photo-electric cells mounted within slide 22 are properly oriented with respect to light source 21 no signals will be generated. This condition will occur when slide 22 is centered exactly with circular light source 21, as illustrated in Fig. 5. It will be apparent that any deviation from this juxtaposition will energize one or two, but not more, of the four photo-electric cells, thus causing slide 22 to move up or down, or right or left; or in a direction which is a combination of two of these.

A rotatable ring 23 encircling slide 22 serves to secure the arcuate member upon which distance-to-go is measured to the latitude slide. A sliding potentiometer 24 is designed to generate signals which, when applied to the servo-motor which actuates the arcuate member, will cause the latter to be extended or retracted an increment of 1' of arc. When in the proper null position (midway of the slide) no signals will be generated. Thus the two members, 22 and 24, are properly related without a rigid connection. The angle which the "Distance" arm makes with the "Latitude" arm is a measure of the course to steer to destination, herein labelled C.

In operation, the computer unit will solve Equations 5 and 8 continuously from information received either from the inertial unit or the celestial unit. Course and distance to destination may be displayed in suitable form for the information of the navigator or pilot, or the values may be relayed to an auto-pilot or similar controller.

This invention will find application in many fields other than in the guidance of aircraft or missiles. It would be particularly advantageous in a submarine which wishes to expose a minimum of its structure above the surface, since the tracker could be mounted in a periscope. Surface craft, particularly those equipped with sextants capable of tracking through the overcast, could fix position continuously and not be dependent upon observations of at least two celestial bodies. A director of the type disclosed herein may be combined with radiosonde units to determine and report continuously the position of a high-altitude sounding balloon. Artillery and rocket-launching units would find this device extremely useful in fixing geographical position and determining range and bearing to a remote target. It will be extremely useful in rapid topographical surveying, particularly in aerial surveying combined with photography.

To illustrate the technique envisioned herein assume that an aircraft at rest on a runway in good visibility is equipped with a director which is tracking the sun. Assume that at a given instant the altitude of the sun is 40° and the rate-of-change of altitude ($dh/dt$), at that instant (as determined by the rate-regulator of Fig. 3) is 0.48862. If, at the same instant, another aircraft passes immediately overhead on course 050° at a speed of 600 knots and is also tracking the sun its director will read the same value of altitude (40°) but an entirely different value of $dh/dt$. This value will be a resultant of the sun's apparent motion with respect to the earth, the velocity of the craft with respect to the earth, and of the relative bearing of the sun with respect to the heading of the aircraft. The velocity of the craft along the line of flight may be obtained from the inertial system through the medium of a resolver. The relative bearing of the sun is obtained from motor 12 of Fig. 1. The rate-of-change of altitude of the sun with respect to the craft is measured by the integrater of Fig. 3. But the velocity of the aircraft along the line-of-azimuth of the sun (the arc $Z_1M$ of Fig. 2) is equal to the velocity of the craft along the line of flight multiplied by the cosine of the relative bearing of the sun. If the true azimuth of the sun at the given instant is 120° and the heading is 050° true then the relative bearing is 120°—050°=070°. The rate-of-change along the line-of-azimuth is then 600/900 × cos 70, or, .666666×.34202=0.22801. If the value of $dh/dt$ as registered by the rate-regulator in the second aircraft is .71663 the difference between this value and the rate-of-change along the line-of-azimuth is equal to 0.71663—0.22801=0.48862; the same value as that recorded by the aircraft on the runway. This value is relayed to the computer unit to solve for position. It is important to note that it is not necessary that true azimuth, per se, be measured. All that is required is the relative bearing of the body being tracked; the true azimuth will be generated by the computer. This is an extremely salient feature of this invention.

From the foregoing description it will be apparent that this invention will provide a guidance system capable of directing a vehicle accurately from one geographical position to another during daylight or darkness, in any weather, at any speed and over any distance. This is possible because the limitations of inertial navigation are off-set by the inherent accuracies of celestial navigation; while the shortcomings of the latter, particularly with respect to the requirement that the celestial bodies must be susceptible of tracking, either optically or radiometrically, are overcome by the ability of the former to function with a high degree of accuracy for limited periods of time under any conditions, and hence to carry on when celestial is inoperative.

From the point of view of military requirements this invention is unique in that it is entirely self-contained, radiates no information that is susceptible to intentional jamming, may be fabricated of sub-miniaturized components to produce a small, light-weight package suitable for use in single-place jet aircraft as well as guided missiles, is fully automatic and may be constructed of components which are presently available or may be readily developed.

Obvious modifications in the form of the various parts and arrangement of the several elements therein may be made without departing from the spirit and scope of this invention.

What is claimed is:

1. A navigational director for a high speed aircraft or missile comprising a star follower for automatically and continuously measuring the true altitude and relative bearing of a single celestial body, a computer means, including means for entering said true altitude and said relative bearing, said computer being responsive to these altitude measurements to determine the instant geographical position of the director when said measurements of the celestial location of the body have been entered, indicator means operated by the computer for indicating continuously the instantaneous longitude and latitude of the director's geographical position and its true heading relative to said celestial body's azimuth as well as the bearing of a desired course, controller means for said craft or missile operated in response to said bearing and heading indicators to maintain the true heading on said course, and a stabilization means comprising gyroscope means having three degrees of rotational freedom, accelerometer means positioned in a horizontal plane, said gyroscope means being responsive to the earth's gravitational field through the medium of said accelerometer means, torque motor means, said accelerometer means producing signals responsive to a displacement from the direction of the true vertical, said signals being applied to said torque motor means to produce precessional forces for maintaining the spin axis of said gyroscope means in a true vertical direction.

2. A navigational director as set forth in claim 1 including a ball-disc rate regulator responsive to signals generated by said star follower to regulate the rate of elevation and of train of said star follower to maintain said celestial body on the axis of said follower.

3. A navigational director as set forth in claim 1 including a rate regulator responsive to signals generated by said star follower in which the position of the ball cage with respect to the center of rotation of the driving disc of said rate regulator is a measure of the derivative of altitude of said celestial body with respect to the hour angle of said celestial body.

4. A navigational director as set forth in claim 1 including a voltage generator responsive to signals generated by said star follower in which a magnetic field or stator winding rotating unidirectionally at a predetermined speed is cut by a rotor rotating in direction and speed proportional to the rotation of the actuating shaft of said star tracker whereby a voltage is generated proportional to the derivative of altitude of said celestial body with respect to the hour angle of said body.

5. A navigational director as set forth in claim 1 including, in combination, an optical star tracker and a radiometric star tracker both responsive to emanations or signals generated by said celestial body for automatically and continuously measuring the true altitude and relative bearing of said celestial body.

6. A navigational director as set forth in claim 1 including a computer composed of arcuate members representing the elements of one or more celestial triangles wherein said arcuate members are pivotally related and mutually aligned by means of light-conversion components responsive to light energy acquired by said star tracker.

7. A navigational director as set forth in claim 1 including, in combination, a rate-regulator responsive to signals generated by said star tracker, a reversible variable-speed motor responsive to signals produced by said rate-regulator to position the drive shaft of said star tracker, a digitizer secured to said drive shaft, said digitizer being responsive to an angular shaft rotation of at least 0.1°, and an integrator responsive to signals generated by said digitizer.

References Cited in the file of this patent
UNITED STATES PATENTS

| | | |
|---|---|---|
| 2,444,933 | Jasperson | July 13, 1948 |
| 2,758,377 | Claret | Aug. 14, 1956 |
| 2,762,123 | Schultz | Sept. 11, 1956 |